United States Patent [19]

Arai et al.

[11] 4,108,022

[45] Aug. 22, 1978

[54] DEVICE FOR CONTROLLING THE SPEED SHIFT OPERATION OF AN AUTOMATIC TRANSMISSION

[75] Inventors: Hajime Arai, Aichi; Kiyoshi Ohnuma, Toyota, both of Japan

[73] Assignee: Toyota Jidosha Kogyo Kabushiki Kaisha, Toyota, Japan

[21] Appl. No.: 736,098

[22] Filed: Oct. 27, 1976

[30] Foreign Application Priority Data

Mar. 9, 1976 [JP] Japan ................................. 51-25379

[51] Int. Cl.$^2$ ............................................. F16H 47/00
[52] U.S. Cl. ...................................... 74/645; 192/3.33
[58] Field of Search ................. 74/645, 732, 733, 867; 192/3.28, 3.29, 3.33

[56] References Cited

U.S. PATENT DOCUMENTS

| 3,638,771 | 2/1972 | Chana | 192/3.33 |
| 3,705,642 | 12/1972 | Thompson | 74/645 X |

Primary Examiner—Samuel Scott
Assistant Examiner—Frank H. McKenzie, Jr.
Attorney, Agent, or Firm—Birch, Stewart, Kolasch & Birch

[57] ABSTRACT

A device for controlling the speed shift operation of an automatic transmission including two change-over valves disposed in a passage transmitting the governor pressure to a servo chamber of a shift valve, the changing-over valves being actuated by the governor pressure and the throttle pressure so as to modify the governor pressure signal supplied to said shift valve thereby accomplishing a modification of a speed shift line to more favorably meet current exhaust gas purification requirements.

6 Claims, 7 Drawing Figures

DEVICE FOR CONTROLLING THE SPEED SHIFT OPERATION OF AN AUTOMATIC TRANSMISSION

BACKGROUND OF THE INVENTION

1. Field of the Invention:

The present invention relates to a transmission and, more particularly, a device for controlling an automatic fluid transmission composed of a torque converter and speed change gears for use with automobiles.

2. Description of the Prior Art:

Automatic fluid transmission are generally adapted to make automatic shifting-over among various speed ranges in accordance with a balance in vehicle speed and throttle opening when the speed shift valve is positioned at its automatic speed shift range. The vehicle speed is preceived as an oil pressure signal proportional to the vehicle speed generated by a governor, while the throttle opening is perceived as another oil pressure signal proportional to the throttle opening generated by a throttle valve. These two oil pressure signals are introduced into one or more shift valves to effect shifting of them thereby selectively engaging or disengaging clutches and/or brakes incorporated in the speed change gears to establish a required speed shift range. Such a shifting of the automatic fluid transmission is generally performed along speed shift lines which coordinate the throttle opening and the vehicle speed. These speed shift lines are characteristic in that a shifting between two speed ranges is effected at a higher vehicle speed when the throttle opening is larger. Furthermore, in order to stablize the operation of the automatic transmission within the shifting ranges, it is adapted to have a hystersis effect in shifting performance so that at the same throttle opening, the downshift is effected at a lower vehicle speed than the upshift.

SUMMARY OF THE INVENTION

The object of the present invention is to provide an automatic transmission having a particular shifting performance in a low vehicle speed range which is favorable in view of exhaust gas purification.

The present invention contemplates to accomplish the aforementioned object by supplying a governor pressure signal to a particular shift valve via two change-over valves and, more particularly, in an automatic fluid transmission comprising an input shaft, an output shaft, a planetary gear mechanism provided between said input and output shafts, and friction engaging means such as friction clutches and brakes adapted to be selectively engaged or disengaged so as to establish a plurality of forward speed ranges and a reverse range. The present invention provides a device for controlling the speed shift operation of said transmission comprising an oil pressure source, a pressure regulating valve for regulating the oil pressure supplied from said oil pressure source to generate a line pressure and servo chambers adapted to receive said line pressure and to actuate said friction engaging means. In addition a governor valve is provided in the device for generating a first oil pressure signal which represents vehicle speed, a throttle valve for generating a second oil pressure signal which represents engine load, a first change-over valve actuated by said first oil pressure signal so as to open when said first oil pressure is above a predetermined value and to close when said first oil pressure is below a predetermined value, a second change-over valve actuated by said second oil pressure signal so as to deliver therefrom said first oil pressure signal when said second oil pressure is below a predetermined value and to deliver therefrom the output signal from said first change-over valve when said second oil pressure is above a predetermined value valve. Further at least one shift valve is provided which is actuated by said second oil pressure signal and said first oil pressure signal transmitted through said second change-over valve or the output signal from said first change-over valve so as to selectively supply oil pressure to said servo chambers.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

Figure 1:
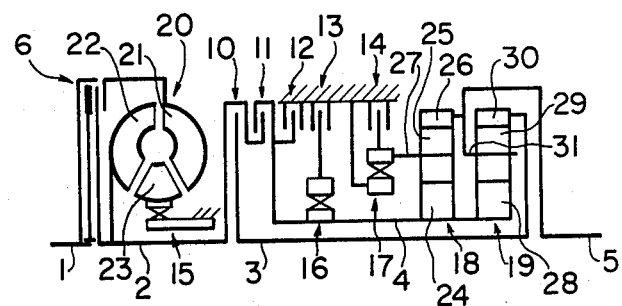
FIG. 1 is a diagrammatical view showing a power transmission mechanism in the automatic transmission in which the present invention is incorporated.

Turning now to the drawings, the transmission herein shown includes an engine output shaft 1, a fluid torque converter 20, an input shaft of a gear transmission mechanism 2, intermediate shafts 3 and 4, planetary gear mechanisms 18 and 19, output shaft 5, two clutches 10 and 11, three brakes, 12, 13 and 14, three one-way cluthes 15, 16 and 17 and a lock-up clutch 6 incorporated in the torque converter 20. The torque converter 20 comprises a pump impeller 21, a turbine runner 22, the one-way clutch 15 and a stator 23 supported by said one-way clutch, wherein the stator adjusts the direction of the out flow from the turbine before it enters into the pump impeller so as to produce a larger torque output in the turbine runner than in the pump impeller as a larger speed difference exists between the pump impeller and the turbine runner. The planetary gear mechanisms 18, 19 comprise, respectively, sun gears 24, 28, planetary pinions 25, 29, ring gears 26, 30 and carriers 27, 31. The power output shaft 1 of the engine is connnected with the pump impeller 21 of the torque converter 20, whereas the power input shaft 2 of the gear transmission is connected with the turbine runner 22 of the torque converter. The input shaft is selectively connected with the intermediate shaft 3 by way of the clutch 10 and with the intermediate shaft 4 by way of the clutch 11, respectively. The intermediate shaft 3 is connected with the ring gear 30 of the planetary gear mechanism 19, whereas the intermediate shaft 4 is connected with the sun gears 24 and 28 of the planetary gear mechanisms 18 and 19, respectively. Furthermore, the shaft 4 is also disposed under the control of the brake 12 and the brake 13, the latter being actuated by way of the one-way clutch 16. The output shaft 5 of the gear transmission is connected with the ring gear 26 of the planetary gear mechanism 18 and is also connected with the carrier 31 of the planetary gear mechanism 19. The carrier 27 of the planetary gear mechanism 18 is disposed under the control of the brake 14 and the one-way clutch 17.

The operation of the aforementioned automatic transmission system is summarized in the following Table 1 in connection with operation of the clutches 10, 11, brakes 12, 13, 14 and one-way clutches 16 and 17:

TABLE I

| Shift Ranges | 10 | 11 | 12 | 13 | 14 | 16 | 17 |
|---|---|---|---|---|---|---|---|
| 1st Speed | 0 | | | | Δ | | * |
| 2nd Speed | 0 | | Δ | 0 | | * | |
| 3rd Speed | 0 | 0 | | 0 | | | |
| Reverse | | | 0 | | 0 | | |

In Table 1, marks "0" indicate that the corresponding clutches or brakes are actuated or engaged. Marks "Δ" indicate that the corresponding brakes are actuated when the engine braking is effected. Marks "*" indicate that the one-way clutches are locked only when the engine effects postive driving.

Figure 2:
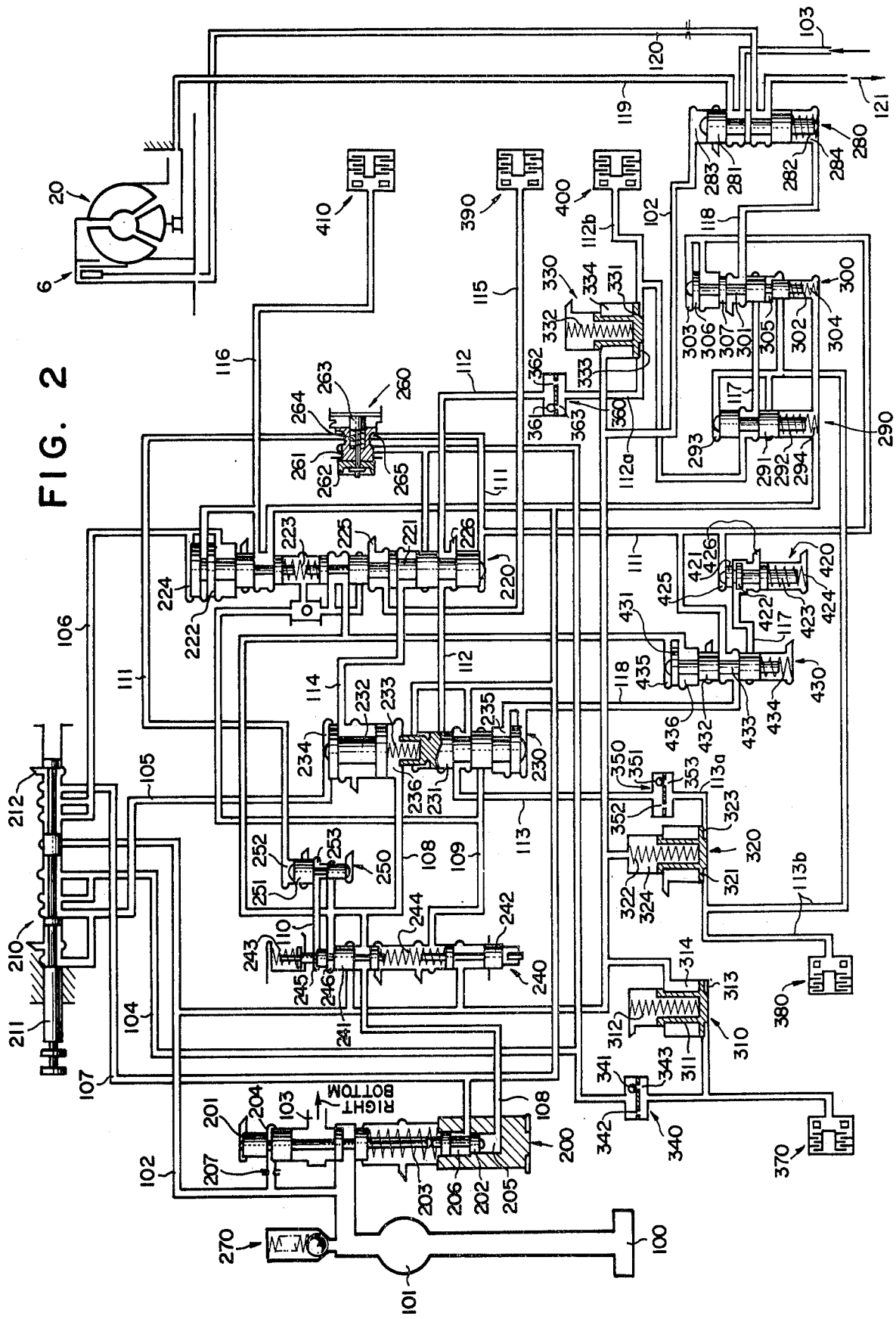
FIG. 2 is a diagram showing an oil pressure circuit as an embodiment of the control device according to the present invention.
Figure 4:
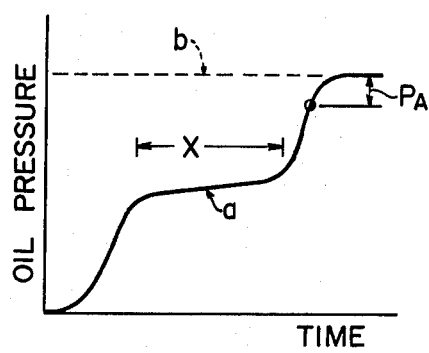
Figure 5:
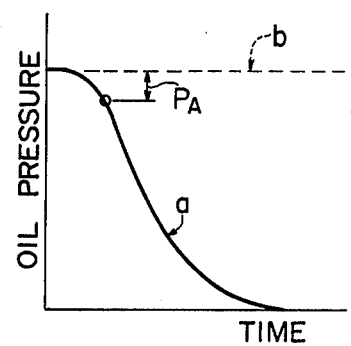
Figure 6:
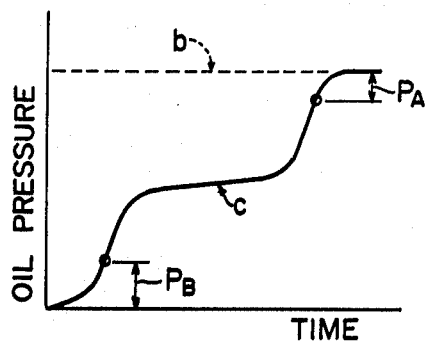
Figure 7:
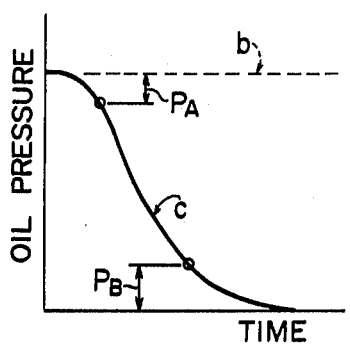

Reference is now made to FIG. 2 showing an embodiment of the oil pressure control system of the invention. In this case, except the below mentioned first and second change-over valves 420 and 430 which constitute the gist of the present invention, the system is identical to that shown in a co-pending Patent application Ser. No. 703,964 entitled "A device for controlling a lock-up clutch in an automatic transmission" filed on July 9, 1976 by Kiyoshi Onuma. Therefore, the portions in the system corresponding to those shown in the previous system are designated by the same reference numerals and, for detailed explanations with respect to those portions which do not directly constitute the gist of the present invention, if necessary, reference should be made of the aforementioned previous application. The system comprises an oil reservoir 100 an oil pump 101, various kinds of valves such as pressure regulating valve 200, speed shift valves 210, 1-2 shift valves 220, 2-3 shift vlaves 230, throttle valve 240, cut back valves 250, governor valves 260, first change-over valve 420, second change-over valve 430, relief valves 270, oil pressure cylinders 370, 380, 390, 400, 410 which actuate clutches 10, 11 and brakes 12, 13, 14, respectively, and oil passages interconnecting these operational elements.

The operation of the oil pressure control system will be explained hereinafter.

The source of oil for the torque concerter 20 and other various lubrication systems is the oil pump 101 which is directly driven by the engine and delivers oil pumped up from the reservoir 100 to the oil passage 102. The oil pressure in the passage 102 is the source of all operating oil pressure in the system and is called "line pressure". The line pressure is regulated at a predetermined pressure level by the pressure regulating valve 200 as explained hereinafter. The relief valve 270 relieves the line pressure when it has risen beyond a normal level. An oil pressure is supplied from the pressure regulating valve 200 through a passage 103 to the torque converter 20 and various lubricating locations. The speed shaft valve 210 comprised a spool 211 which is shifted in accordance with the handling of a driver's lever so as to supply the line pressure supplied from the passage 102 to passages 104, 105, 106 and 107 in accordance with the shift position of the driver's lever, as summarized in Table 2.

TABLE 2

| Shift Positions | Passage 104 | Passage 105 | Passage 106 | Passage 107 |
|---|---|---|---|---|
| R-Position | — | — | 0 | 0 |
| N-Position | — | — | — | — |
| D-Position | 0 | — | — | — |
| 2-Position | 0 | 0 | — | — |
| L-Position | 0 | 0 | 0 | — |

Marks "0" in Table 2 indicate that the line pressure is supplied to the corresponding passages, whereas marks "—" indicate that the line pressure is not supplied to the corresponding passages. In the table R-Position means reversing, N-Position means neutral, D-Position means forward 3 speed automatic transmission, 2-Position means automatic transmission between formed 1st speed and 2nd speed, and L-Position means fixing to forward 1st speed range.

In D-Position, the line pressure is supplied from passage 104 to the oil pressure cylinder 370, whereby the clutch 10 is constantly engaged. The passage 104 also supplies the line pressure to 1-2 shift valve 220 and governor valve 260. The 1-2 shift valve 220 comprises spools 221, 222 and spring 223, wherein the spool 221 is shifted downward in 1st speed range thereby intercepting the line pressure from the passage 104 toward any passages. In 2nd and 3rd speed ranges, the spool 221 is shifted upward by the governor pressure supplied through passage 111, whereupon it conducts the line pressure from passage 104 to passage 112. The passage 112 communicates to 2-3 shift valve 230 and also to oil pressure cylinder 400 of the brake 13, whereby the brake 13 is actuated. When the brake 13 is actuated, the transmission operates in the 2nd speed range as seen in Table 1. The 2-3 shift valve 230 comprises spools 231, 232 and a spring 233, wherein the spool 231 is shifted downward in 1st and 2nd speed ranges while in 3rd speed range, the spool 231 is shifted upward as explained hereinafter by the governor pressure from passage 118 thereby conducting the line pressure from passage 112 to passage 113 which further conducts the pressure to oil pressure cylinder 380 of the clutch 11 which is then actuated. Upon engagement of the clutch 11, the transmission operates in the 3rd speed range, as seen in Table 1.

In the 2-Position, the line pressure is supplied to passages 104 and 105. The line pressure supplied to the passage 105 is introduced into a chamber 234 of the 2-3 shift valve 230 thereby holding the spools 231, 232 downward, while the pressure is also conducted through passage 114. When the 1-2 shift valve 220 is not in 1st speed range, the passage 114 communicates to a passage 115 through the 1-2 shift valve 220 thereby supplying the line pressure to oil pressure cylinder 390 of the brake 12 which is then actuated. The line pressure in the passage 104 is supplied to oil pressure cylinder 370 of the clutch 10 and is also conducted through the 1-2 shift valve 220 and passage 112 to oil pressure cylinder 400 of the brake 13. Thus, the clutch 10 and the brake 13 are actuated. When the brake 12 is actuated, the sun gears 24 and 28 of the planetary gear mechanisms 18 and 19 are braked from rotation in either direction, whereby the engine brake is effected. Upon engagement of the clutch 10 and brakes 12 and 13, the transmission operates in the 2nd speed range as seen in Table 1. When the 1-2 shift valve 220 is shifted to 1st speed range, i.e. the spool 221 is shifted downward, the passage 115 communicates to an exhaust passage 225, whereby the brake 12 is released, and, simultaneously, the passage 112 is connected to an exhaust passage 226 whereby the brake 13 is also released. Thus, the transmission is brought to the 1st speed condition.

In L-Position, the line pressure is supplied to passages 104, 105 and 106. The line pressure supplied to the passage 104 actuates the clutch 10 in the same manner as in individual speed ranges effected under D-Position. The line pressure supplied to the passage 105 is introduced into oil chamber 234 and holds spools 231 and 232 of 2-3 shift valve 230 in the downward shifted position. The line pressure supplied to passage 106 is applied to chamber 224 of the 1-2 shift valve 220 thereby holding spools 221 and 222 in the downward shifted position. The line pressure is further transmitted therefrom through passage 116 to oil pressure chamber 410 of the brake 14 which is then actuated. When the brake 14 is actuated, the carrier 27 of the planetary gear mechanism is braked from rotating in either direction, thereby effecting the engine brake. Thus, upon actuation of the clutch 10 and brake 14, the transmission operates in the 1st speed range, as indicated in Table 1.

In R-Position, the line pressure is supplied to passages 106 and 107. The line pressure supplied to the passsage 107 is conducted to chamber 206 of the line pressure regulating valve 200 and operates in a manner to increase the line pressure. The line pressure is further conducted through 2-3 shift valve 230 and passage 113 to oil pressure cylinder 380 of the clutch 11 which is then actuated. Simultaneously, the line pressure in the passage 107 is conducted through 1-2 shift valve 220 and passage 116 to oil pressure cylinder 410 of the brake 14 which is then actuated. Therefore, the clutch 11 and brake 14 are actuated, whereby the transmission is put into reverse range as indiated in Table 1.

The governor valve 260 comprises a governor valve element 261, governor weight 262, governor shaft 263, spring 264 and oil chamber 265. The governor valve is mounted to the output shaft 5 in FIG. 1. The governor valve produces an oil pressure called "governor pressure" in passage 111 depending upon a balance in the centrifugal force generated by the mass of the governor weight 262, governor shaft 263 and spring 264, the spring force exerted by the spring 264 and the oil pressure supplied to the oil chamber 265, said governor pressure increasing in accordance with or generally in proporation to the rotational speed of the output shaft.

The throttle valve 240 comprises a spool 241, downshift plug 242, springs 243, 244 and oil chambers 245, 246 and produces a throttle pressure in passage 108 depending upon a balance in the spring force exerted by the spring 244 in accordance with the movement of the downshift plug 242 and the oil pressure supplied to the chambers 245 and 246, said throttle pressure increasing in proportion to the throttle opening. The throttle pressure in the passage 108 is supplied to 1-2 shift valve 220 and 2-3 shift valve 230 to control the changing-over of the transmission in accordance with changes of load. When the accelerating pedal is strongly depressed to effect the kick-down, the down-shift plug 242 moves upward to a position where the passage 112 is connected to the passage 109. The line pressure is then conducted through the passage 109 to 1-2 shift valve 220 and 2-3 shift valve 230 thereby applying downward pressures to the spool 221 and 231 which are then shifted from 3rd speed position to 2nd speed position or from 2nd speed position to 1st speed position depending upon a balance in the pressure and the governor pressure applied to the lower end of the spools.

The cutback valve 250 comprises a spool 251 and chambers 252, 253 and produces a cutback pressure in the passage 110 depending upon a balance in oil pressures supplied to the chambers 252 and 253. The cutback pressure in the passage 110 affects the throttle valve 240 to lower the throttle pressure thereby reducing a loss of power uselessly consumed by the oil pump.

The pressure regulating valve 200 comprises spools 201, 202, spring 203, chambers 204, 205, 206 and an orifice 207 provided at the entrance of the chamber 204 and produces the line pressure in the passage 102 depending upon a balance in oil pressures existing in the chambers 204, 205 and 206 and the force of the spring 203.

The first change-over valve 240 comprises a spool 423 having lands 421 and 422, a spring 424 and an oil chamber 425, wherein the governor pressure in supplied to the oil chamber 425 through passage 111. The force due to the oil pressure acting at the upper surface of the land 421 in the oil chamber 425 is opposed by the force of spring 424, whereby when the governor pressure increases beyond a predetermined value, e.g. $P_{G1}$, the spool 423 moves downward thereby connecting the passage 111 with the passage 117. In other words, the passage 117 is supplied with the governor pressure only when the governor pressure has exceeded the value $P_{G1}$. Under the condition that the governor pressure is above $P_{G1}$ with the change-over valve 420 being opened, i.e., passages 111 and 117 are connected with each other, the governor pressure existing in the chamber 425 is exerted on the lands 421 and 422. Since the land 422 is larger in diameter that the land 421 as apparent from the figure, the governor pressure in the chamber 425 is exerted on the land 422. In other words, before the change-over valve 420 is opened, the governor pressure is exerted on the land 421 (effective cross sectional area $A_1$), whereas after the change-over valve 420 is opened, the pressure is effectively exerted is the larger land 422 (effective cross-sectional area $B_1$). Therefore, the governor pressure $P_{G2}$ at which the change-over valve 420 is again closed is lower than the governor pressure $P_{G1}$ at which the change-over valve 420 is opened by the ratio of $A_1/B_1$. This gives a hystersis effect to the operation of the change-over valve 420, whereby it is effected that if the change-over valve 420 is once opened, the passages 117 and 111 are maintained in communication with each other so that the passage 117 is supplied with the governor pressure until the governor pressure is reduced below $P_{G2}$ which is lower than the value $P_{G1}$.

The second change-over valve 430 comprises a spool 433 having lands 431 and 432, a spring 434 a chambers 435 and 436. The spool is shifted in accordance with the throttle pressure supplied to the chambers 435 and 436 so that communications between passages 111 and 118 and between 117 and 118 are changed-over. When the throttle pressure is below a predetermined value $P_{T1}$, the spool 433 is positioned upward in the figure by the action of the spring 434 thereby connecting the passage 111 with the passage 118. Then, the governor pressure in passage 111 is conducted through the passage 118 to the 2-3 shift valve 230. Under this condition, the throttle pressure is supplied to chambers 435 and 436. As shown in the figure, the land 431 is larger in diameter than the land 432. When the throttle pressure is supplied to both the chambers 435 and 436, the force exerted by the throttle pressure to drive the spool 433 downward is generated at the land 432 (effective cross-sectional area $A_2$). When the throttle pressure has increased beyond a predetermined value $P_{T1}$, the spool 433 is shifted downward against the action of the spring 434 thereby connecting the passage 117 with the passage 118. When the spool has shifted downward, the throttle pressure exerts pressure on onto the land 341 (effective cross-sectional area $B_2$). In other words, before the spool 433 is shifted downward, the throttle pressure exerts pressure on the land 432 of cross-sectional area $A_2$, whereas after the spool 433 has shifted downward, the throttle pressure exerts pressure on the larger land 431 of cross-sectional area $B_2$. Therefore, the throttle pressure $P_{T2}$ at which the spool 433 is again shifted upward is lower than the throttle pressure $P_{T1}$ at which the spool 433 is shifted downward by the ratio of $A_2/B_2$. This gives a hysteresis effect to the change-over valve 430.

The operation of the transmission control device of the present invention which incorporates the above-explained change-over valves 420 and 430 and 2-3 shift valve 230 will be explained hereinunder with reference to FIGS. 2 and 3.

Figure 3:
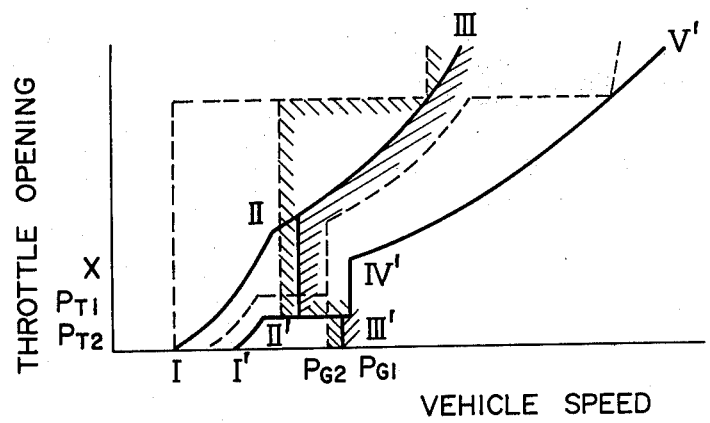
FIG. 3 is a speed shift diagram obtained by the device according to the present invention; and, FIGS. 4–7 are graphs showing variations of oil pressure supplied to clutches and brakes during change-over between different speed ranges, the performance of the oil pressure representing the performance of accumulators.

In FIG. 3, the abscissa represents vehicle speed and the ordinate represents throttle opening, wherein the lines coordinating the two values are speed shift lines.

The upshift from 1st speed to 2nd speed is effected as in the conventional automatic transmission, i.e. it is controlled by a balance in the throttle pressure supplied through passage 108 and the governor pressure supplied through passage 111 in accordance with the speed shift line I-II-III in FIG. 3.

The upshift from 2nd speed range to 3rd speed range is now explained. When the throttle pressure is below a predetermined value $P_{T1}$, since the spool 433 of the change-over valve 430 is shifted upward in the figure, the governor pressure supplied from passage 111 is transmitted to passage 118 via the change-over valve 430, the pressure further being supplied to the chamber 235 of the 2-3 shift valve 230. Then, the shifting along the speed shift line I'-II' is effected according to a balance in the governor pressure acting in the chamber 235 and the throttle pressure acting in the chamber 236.

When the throttle pressure has increased beyond a predetermined value $P_{T1}$, the spool 433 of the change-over valve 430 is shifted downward in the figure, thereby intercepting the connection between the passages 111 and 118, whereas communication between the passages 117 and 118 is established. In this case, if the governor pressure is below a predetermined value $P_{G1}$, the spool 423 of the change-over valve 420 is shifted upward in the figure, whereby the passage 117 is connected to an exhaust port 426. Then, the governor pressure contained in the passage 118 is exhausted through passage 117 and the exhaust port 426, whereby the 2-3 Shift valve 230 is shifted to 2nd speed shift range. When the throttle pressure becomes lower than a predetermined value $P_{T2}$, the spool 433 of the change-over valve 430 moves upward in the figure thereby establishing communication between passages 111 and 118, whereby the governor pressure is supplied through passages 111 and 118 to the chamber 235 of 2-3 shift valve 230. Then, 3rd speed range is established (see the shift line II'-III' in FIG. 3).

Starting from this condition, if the vehicle speed further increases so far that the governor pressure exceeds the predetermined value $P_{G1}$, the spool 423 of the change-over valve 420 is shifted downward in the figure, thereby connecting the passage 111 with the passage 117. Thus, the governor pressure supplied through passage 111 is conducted through passage 117, change-over valve 430 and passage 118 to the chamber 235 of 2-3 shift valve 230. Thus the speed shifting is effected in accordance with a balance in the governor pressure acting through the chamber 235 and the throttle pressure acting in the chamber 236. Under this condition, if the throttle opening is smaller than X, the force $F_2$ which urges the spool upward in the figure due to the governor pressure of value $P_{G1}$ acting in the chamber 235 is larger than the force F1 which urges the spool downward in the figure due to the throttle pressure acting in the chamber 236 and the spring 233, whereby the range is immediately shifted to 3rd speed range upon actuation of the governor pressure into the chamber 235 effected by the opening action of the change-over valve 420 which communicates the passage 117 to the passage 118. Therefore, when the throttle opening is smaller than X, speed shifting is effected at a constant vehicle speed, i.e., along the speed shift line III'-IV'. When the throttle opening is larger than X, the upshifting from 2nd speed to 3rd speed is not effected until the vehicle speed becomes sufficiently high so that the force $F_2$ which urges the spool 231 upward in the figure becomes larger than the force $F_1$ which urges the spool downward in the figure. In other words, when the throttle opening is larger than X, the speed shifting is effected in accordance with a balance in the throttle pressure and the governor pressure along the speed shift line VI'-V' in FIG. 3. FIG. 3 further includes a speed shift line at the time of downshifting indicated by a broken line. The hystersis effect that the upshift line (solid line) and the downshift line (broken line) are shifted from each other is obtained by the fact that there is provided, a difference in the land face areas in the 1-2 shift valve 220, 2-3 shift valve 230 and change-over valves 420 and 430.

Next, a control circuit for the lock-up clutch 6 incorporated in the torque converter 20 will be explained.

The lock-up shift value 280 comprises a spool 281 spring 282 and chambers 283, 284, wherein the chamber 283 is constantly supplied with the line pressure. When the difference between the oil pressure in the chamber 284 and the line pressure is larger than a predetermined pressure difference $P_4$, the spool 281 is shifted downward by the line pressure existing in the chamber 283 thereby connecting passage 103 to passage 119. The oil pressure supplied from the passage 103 is circulated through passage 119 and the torque converter 20 to return through passage 120 toward an exhaust passage 121 thereby disengaging the lock-up clutch 6. When the difference between the oil pressures acting in the chambers 284 and 283 has become smaller than the difference value $P_4$, the spool 281 is shifted upward thereby connecting passage 103 to passage 120. Then, the oil pressure in passage 103 is supplied through passage 120 to the lock-up clutch 6 which is now engaged.

The 2-3 relay valve 290 comprises a spool 291, spring 292 and chamber 293, 294. When the oil pressure acting in the chamber 293 is below a predetermined value $P_B$, the spool 291 is shifted upward by the force of spring 292 thereby connecting passage 112b to passage 117. When the oil pressure acting in the chamber 293 has arisen beyond the value $P_B$, the spool 291 is shifted downward against the force of spring 292, thereby connecting passage 113b to passage 117. In reverse range, wherein oil pressure is supplied to the chamber 294, the spool 291 is maintained in its upward shifted position.

The lock-up shift control valve 300 comprises a spool 301, spring 302 and chambers 303, 304. When the governor pressure supplied to the chamber 303 is below a predetermined value $P_1$, the spool 301 is shifted upward by the force of spring 302 thereby blocking the passage 117. When the governor pressure acting in the chamber 303 has increased beyond the value $P_1$, the spool 301 is shifted downward against the force of spring 302 thereby connecting passage 117 to passage 118. In reverse range, wherein oil pressure is supplied in the chamber 304, the spool 301 is maintained in its upward position.

Furthermore, since a land 306 has a larger diameter than a land 307, when the spool 301 is shifted in the upper position, the governor pressure supplied from passage 111 is exerted on area A of the land 307 but when the spool 301 is shifted in the lower position, the governor pressure is exerted on area B of the land 306. Therefore, the governor pressure $P_2$ which is the limit to allow the spool to move upward is lower than the governor pressure $P_1$ which is the limit to drive the spool downward by the ratio of A/B, thus giving a hysterisis effect to the shifting operation of the lock-up shift control valve.

The passage 113b communicates to a chamber 305 of the lock-up shift control valve 300. Therefore, the chamber 305 is supplied with oil pressure from the passage 113b in forward 3rd speed range, thereby applying upward driving force to the spool 301. Consequently, the governor pressure $P'_1$, acting in the chamber 303 when the spool 301 is shifted downward in 3rd speed range is larger than the governor pressure $P_1$ in 2nd speed range.

Forward 1st speed range . . . passages 112 and 113 are not supplied with oil pressure and, accordingly, oil pressure does not exist in chamber 284 of the lock-up shift valve 280. Consequently, the spool 281 is maintained in the lower position by the line pressure acting in chamber 283 thereby connecting passage 103 to passage 119. Then the oil pressure supplied from passage 103 is conducted through passage 119 to the torque converter 20 and, after having traversed the torque converter while maintaining the lock-up clutch 6 disengaged, the oil pressure is discharged through passage 120, lock-up clutch shift valve 280 and exhaust passage 121. Therefore, in the forward 1st speed range, the lock-up clutch 6 is disengaged.

1-2 upshift . . . When the vehicle speed has increased in the forward 1st speed range (lock-up clutch 6 is disengaged) so far that the spool 221 of 1-2 shift valve 220 is shifted upward thereby supplying oil pressure in passage 112, the pressure is gradually transmitted through the orifice 362 of the check valve 360, passage 112a and accumulator 330 to passage 112b. The passage 112b communicates to the oil pressure cylinder 400 and the 2-3 relay valve 290. Since oil pressure does not exist in chamber 293 of the 2-3 relay valve 290, the spool 291 is shifted upward by spring 292 thereby connecting passage 112b to passage 117. The passage 117 communicates to the lock-up shift control valve 300. The spool 301 of the lock-up shift control valve 300 is disposed under the control of the governor pressure acting in the chamber 303 so that the spool is shifted upward by spring 302 when the governor pressure is below the predetermined value $P_1$ whereas the spool is shifted downward against the force of spring 302 when the governor pressure has increased beyond the value $P_1$ thereby connecting oil passage 117 to passage 118. The passage 118 communicates to the chamber 284 of the lock-up shift valve 280. When the oil pressure in the passage 112b has gradually increased to be above a predetermined value, the piston in the oil pressure cylinder 400 is actuated to engage the brake 13. When the pressure in the passage 112b has further increased so far that the difference between the pressure and the line pressure acting in the chamber 283 becomes smaller than the predetermined value $P_A$, if the governor pressure in passage 111 has also become the predetermined value $P_1$, the oil pressure in passage 112b is supplied to the chamber 284 of the lock-up shift valve 280 thereby driving the spool 281 upward thereby connecting passages 103 and 120. Then, the oil pressure in the passage 103 is supplied to passage 120, thus putting the lock-up clutch 6 into engagement. Therefore, in 1-2 upshift, the brake 13 is engaged while the lock-up clutch 6 is disengaged and after the completion of 1-2 upshift, the lock-up clutch 6 is engaged, 2-3 upshift . . . When the vehicle speed has further increased in forward 2nd speed range (lock-up clutch 6 is engaged) so far that the spool 231 of the 203 shift valve 330 is shifted upward thereby supplying oil pressure in passage 113, the oil pressure is gradually transmitted therefrom through orifice 352 of the check valve 350, passage 113a and accumulator 320 to passage 113b. The passage 113b communicates to the oil pressure cylinder 380 and also to the 2-3 relay valve 290 and the lock-up shift control valve 300. When the oil pressure in the passage 113b has gradually increased to reach the predetermined value $P_B$, the spool 291 of the 2-3 relay valve 290 is shifted downward thereby connecting passage 113b to passage 117 while intercepting passage 112b. Up to the moment, the oil pressure in the passage 113b, is smaller than that in the passage 112b and, consequently, the oil pressure in the chamber 284 of the lock-up shift valve 280 lowers due to relief of pressure through passage 118, lock-up shift control valve 300, passage 117 and 2-3 relay valve 290 until it becomes equal to the pressure in the passage 113b. At the moment the difference between the oil pressure acting in the chamber 284 and the line pressure acting in the chamber 283 is larger than the predetermined value $P_A$ and, accordingly, the spool 281 is shifted downward thereby connecting passage 113 to passage 119 resulting in disengagement of the lock-up clutch 6. When the oil pressure in the passage 113b has further increased, the piston in the oil pressure cylinder 380 is actuated to engage the clutch 11 thereby accomplishing 3rd space range. When the oil pressure in the passage 113b has further increased so far that the difference between the pressure and the line pressure in the chamber 283 becomes smaller than the predetermined value $P_A$, the spool 281 of the lock-up shift valve 280 is shifted upward thereby connecting passage 103 to passage 120, whereby the lock-up clutch 6 is engaged. Therefore, in 2-3 upshift, the clutch 11 is engaged while the lock-up clutch 6 is disengaged and, after the completion of 2-3 upshift, the lock-up clutch 6 is again engaged.

3-2 downshift . . . When the vehicle speed has decreased in forward 3rd speed range (lock-up clutch 6 is engaged), the spool 231 of 2-3 shift valve 230 is shifted downward thereby connecting passages 113 and 107. Then, the oil pressure in the oil pressure cylinder 380 and the oil pressure in the chamber 284 of the lock-up shift valve 280 are gradually exhausted through passages 113b, 113a, check valve 350, passages 113, 107 and exhaust port 212 of the speed shift valve 210. When the oil pressure in the chamber 284 of the lock-up shift valve 280 has been reduced so that the difference between the pressure and the line pressure acting in the chamber 283 becomes larger than the predetermined value $P_A$, the spool 281 is shifted downward thereby connecting passage 103 to passage 119, thus disengaging the lock-up clutch 6. When the oil pressure in the passage 113b has further been reduced with the lock-up clutch 6 being diengaged, the clutch 11 is disengaged thereby establishing 2nd speed range. When the oil pressure in the passage 113b has further lowered to be been reduced so as than the predetermined value $P_B$, the spool 291 of the 2-3 relay valve 290 is shifted upward thereby disconnecting passage 117 from passage 113b while connecting passages 112b and 117. Then, the oil pressure in the passage 112b is supplied through passages 117 and 118 to the chamber 284 of the lock-up shift valve 280. Since the oil pressure in the passage 112b acting in the chamber 284 is high and the difference between the pressure and the line pressure acting in the chamber 283 is smaller than the predetermined value $P_A$, the spool 281 is shifted upward thereby connecting passage 103 to passage 120 thus effecting engagement of the lock-up clutch 6. Therefore, in 3-2 downshift, the clutch 11 is disengaged while the lock-up clutch 6 is disengaged and after the completion of 3-2 downshift, the lock-up clutch 6 is again engaged.

2-1 downshift . . . , When the vehicle speed has further decreased in forward 2nd speed range (lock-up clutch 6 is engaged) the spool 221 of 1-2 shift valve 220 is shifted downward thereby connecting passages 112 and 226. Consequently, the oil pressure in the oil pressure cylinder 400 and the chamber 284 of the lock-up shift valve 280 is gradually exhausted through passages 118, 117, 112b, 112a, check valve 360, passage 112 and exhaust passage 226. When the oil pressure in the chamber 284 of the lock-up shift valve 280 has been reduced so that the difference between the pressure and the line pressure acting in the chamber 283 becomes larger than the predetermined value $P_A$, the spool 281 is shifted downward, thereby connecting passage 103 to passage 119, thus disengaging the lock-up clutch 6. When the oil pressure in the passage 112b has further been reduced with the lock-up clutch 6 being disengaged, the brake 13 is disengaged thereby establishing forward 1st speed range.

As explained above, the present invention proposes to employ two change-over valves through which the governor pressure is transmitted to a particular shift valve. By this arrangement, the speed shifting characteristic in a low vehicle speed range is improved in view of the exhaust gas purification. Furthermore, when the present invention is incorporated in automatic transmissions including a torque converter equipped with a lock-up clutch, the improvement in view of the exhaust gas purification is more effectively accomplished.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. In an automatic fluid transmission comprising an input shaft, an output shaft, a planetary gear mechanism provided between said input and output shafts, and friction engaging means adapted to be selectively engaged or disengaged so as to establish a plurality of forward speed ranges and a reverse range, a device for controlling the speed shift operation of said transmission comprising:

an oil pressure source;

a pressure regulating valve for regulating the oil pressure supplied from said oil pressure source to generate a line pressure;

servo chambers adapted to receive said line pressure and to actuate friction engaging means;

a governor valve for generating a first oil pressure signal which represents vehicle speed;

a throttle valve for generating a second oil pressure signal which represents engine load;

at least one shift valve actuated by the balance between said first oil pressure signal and said second oil pressure signal so as to selectively supply oil pressure to said servo chambers; and a valve composite including a first change-over valve actuated by said first oil pressure signal and a second change-over valve actuated by said second oil pressure signal and adapted to intercept the supply of said first oil pressure signal to said shift valve only when said first oil pressure signal is below a first predetermined value and said second oil pressure signal is above a second predetermined value.

2. The device of claim 1, further comprising a lock-up clutch control system adapted to operate depending upon a pressure signal existing in said servo chambers to engage or disengage a lock-up clutch incorporated in said torque converter.

3. The device of claim 1, wherein said first change-over valve comprises a spool having first and second lands, said first land having a smaller effective pressure receiving face than said second land, said first land being effectively exposed to said first oil pressure signal when said first oil pressure signal is below said first predetermined value, whereas said second land is effectively exposed to said first oil pressure signal when said first oil pressure signal is above said first predetermined value thereby giving a hysteresis effect to the change-over operation of said first change-over valve.

4. The device of claim 1, wherein said second change-over valve comprises a spool having first and second lands, said first land having a smaller effective pressure receiving face than said second land, said first land being effectively exposed to said second oil pressure signal when said second oil pressure signal is below said second predetermined value, whereas said second land is effectively exposed to said second oil pressure signal when said second oil pressure signal is above said second predetermined value thereby giving a hysteresis effect to the change-over operation of said second change-over valve.

5. The device of claim 1, wherein the friction engaging means are friction clutches.

6. The device of claim 1, wherein the friction engaging means are brakes.

* * * * *